(12) United States Patent
Kim et al.

(10) Patent No.: US 9,130,868 B2
(45) Date of Patent: Sep. 8, 2015

(54) CROSS LAYER PATH PROVISIONING METHOD AND SYSTEM IN MULTI LAYER TRANSPORT NETWORK

(75) Inventors: Tae Yeon Kim, Daejeon (KR); Seung Hyun Yoon, Daejeon (KR); Hyung Seok Chung, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 874 days.

(21) Appl. No.: 13/275,973

(22) Filed: Oct. 18, 2011

(65) Prior Publication Data

US 2012/0093030 A1  Apr. 19, 2012

(30) Foreign Application Priority Data

Oct. 18, 2010 (KR) ........................ 10-2010-0101362

(51) Int. Cl.
*H04L 12/28* (2006.01)
*H04L 12/717* (2013.01)
*H04L 12/715* (2013.01)

(52) U.S. Cl.
CPC ................ *H04L 45/42* (2013.01); *H04L 45/64* (2013.01)

(58) Field of Classification Search
USPC ................................................. 370/252, 254
See application file for complete search history.

(56) References Cited

U.S. PATENT DOCUMENTS

| | | | |
|---|---|---|---|
| 7,733,786 B2 | 6/2010 | Lu | |
| 2007/0038734 A1 | 2/2007 | Grammel | |
| 2008/0091809 A1* | 4/2008 | Lee | ............................... 709/223 |

FOREIGN PATENT DOCUMENTS

| | | |
|---|---|---|
| JP | 2006-261806 | 9/2006 |
| KR | 10-2009-0060931 | 6/2009 |
| KR | 10-1004309 | 12/2010 |
| KR | 10-1231738 | 2/2013 |
| WO | 2008/046322 A1 | 4/2008 |

OTHER PUBLICATIONS

University of Electro-Communications by E Oki, Mar. 2009.*

* cited by examiner

*Primary Examiner* — Dang Ton
*Assistant Examiner* — Pamit Kaur
(74) *Attorney, Agent, or Firm* — Nelson Mullins Riley & Scarborough LLP; Anthony A. Laurentano, Esq.; Lewis Lee, Esq.

(57) ABSTRACT

Disclosed is an inter-layer path provisioning method and system in a multilayer network that may set, in response to a path setting request of an operator, an upper layer path to be interlocked with an upper layer path computation unit, set, separately from the setting of the upper layer path, a lower layer path to be interlocked with a lower layer path computation unit, and perform a connection between the set upper layer path and the set lower layer path, so that inter-layer path setting may be readily performed in a multilayer transport network.

15 Claims, 7 Drawing Sheets

CROSS LAYER PATH PROVISIONING METHOD AND SYSTEM IN MULTI LAYER TRANSPORT NETWORK

CROSS-REFERENCE TO RELATED APPLICATION

This application claims the benefit of Korean Patent Application No. 10-2010-0101362, filed on Oct. 18, 2010, in the Korean Intellectual Property Office, the disclosure of which is incorporated herein by reference.

BACKGROUND

1. Field of the Invention

The present invention relates to a technique that enables inter-layer path provisioning to be readily performed in a multilayer transport network.

2. Description of the Related Art

Due to the recent increase in Internet traffic, to simplify a current network structure in which a packet network, a circuit network, and an optical transport network are mixed, and to ensure a transmission quality of future premium Internet Protocol (IP) multimedia traffic, packet-optical integrated network construction and network control technology development may be required. Particularly, as a synchronous optical networking (SONET)/synchronous digital hierarchy (SDH)-centered optical transport network evolves into a dynamic packet transport network, path and resource control technologies based on transport characteristics of packet traffic and service quality may be used.

That is, in a multilayer network in which a single network is configured to have multiple layers, traffic engineering between layers may be used so as to improve efficiency of network by optimizing resources of the network based on all layers rather than separately optimizing the resources for each layer.

Accordingly, the international organization for standardization (ISO) such as Internet Engineering Task Force (IETF), and the like recognizes that a traffic engineering technology through Multiprotocol Label Switching (MPLS) and Generalized MPLS (GMPLS) based on a path computation unit (PCE) is required for inter-layer path setting using optimized resources. Thus, in IETF, function formulation and role of the PCE for provisioning between layers different from a single layer and a Virtual Network Topology Manager (VNTM) for control are required.

For example, three models are provided for inter-layer path computation as follows. First, a model that computes a path in which all layers are integrated through a single PCE is provided. Second, a model that computes an entire path based on path information of layers through a communication between the PCE and a separate PCE for each layer is provided. Third, a model that computes a path only within each layer without an interlocking between PCEs even though the PCE between layers is present is provided.

In addition, similar to the path computation method, several possible models are provided as a path control technology between layers as follows. First, PCE-VNTM cooperation model is provided. In this model, the path setting between layers is performed through role sharing between the PCE and the VNTM. Second, an upper layer signaling model that controls a path through signaling for each layer when a Label Switched Path (LSP) of a lower layer is used based on primarily working signaling entity without the VNTM is provided. Third, a Network Management System (NMS)-VNTM integrated cooperation model that manages a virtual network topology in a view of network management is provided. Finally, an NMS-VNTM separated cooperation model that configures a Traffic Engineering (TE) link through the VNTM only when a lower layer LSP is used in a process of proceeding a path in an upper layer of an NMS in a state in which the PCE is maintained for each existing separated layer is provided. In this instance, there is a need to review advantages and disadvantages for various configurations based on a combination between the NMS-VNTM separated cooperation model and the path computation method.

When path setting between multi-layers is performed by conventional path computation technologies and path control technologies, problems in topology management between the upper layer and the lower layer are generated. In a network node, a specific method for managing topology information between layers, that is, the upper layer and the lower layer in various situations such as in an upper layer node, a lower layer node, and an upper and lower layer integrated node is required. However, all virtual TE links are reflected on the upper layer, and thereby complexity is increased, and a path computation performance of the upper layer is deteriorated.

SUMMARY

An aspect of the present invention provides an inter-layer path provisioning method and system in a multilayer network that sets a lower layer path, separately from setting of an upper layer, thereby guaranteeing independence of a path computation unit existing for each layer, and protecting inter-layer path information.

Another aspect of the present invention provides an inter-layer path provisioning method and system in a multilayer network that enables an unconnected virtual link (link of a second type) in topology information between an upper layer path and a lower layer path to be selectively used on the upper layer path by an operator, thereby reducing complexity in path computation.

According to an aspect of the present invention, there is provided an inter-layer path provisioning system in a multi-layer network, the inter-layer path provisioning system including: an upper layer path setting unit to set an upper layer path to be interlocked with an upper layer path computation unit, in response to a path setting request of an operator; a lower layer path setting unit to set a lower layer path to be interlocked with a lower layer path computation unit, separately from the setting of the upper layer path; and a cross-layer management unit to perform a connection between the set upper layer path and the set lower layer path.

The upper layer path may be associated with a plurality of packet node paths included in a packet layer, and the lower layer path may be associated with a plurality of optical node paths included in an optical layer.

The upper layer path computation unit may extract packet layer Traffic Engineering (TE) link information from a TE Database (TEDB) of a packet transport layer, compute a path among respective packet nodes included in the upper layer using the extracted packet layer TE link information, and transport the computed path among the respective packet nodes to the upper layer path setting unit. Here, the upper layer path setting unit may set the upper layer path using the transported path among the respective packet nodes.

The cross-layer management unit may configure inter-layer topology information using a TEDB of a packet transport layer and a TEDB of an optical transport layer, and perform the connection between the upper layer path and the lower layer path based on the configured topology information.

The lower layer path computation unit may extract optical layer TE link information from a TEDB of an optical transport layer, compute a path among respective nodes included in the lower layer using the extracted optical layer TE link information, and transport the computed path among the respective nodes to the lower layer path setting unit. In this instance, the lower layer path setting unit may set the lower layer path using the transported path among the respective packet nodes.

The cross-layer management unit may analyze a relationship of a packet node included in the upper layer with an optical node included in the lower layer, extract connectable packet node link information from the upper layer, designates, as a first type, the optical node and a link of which a path has been already set, from among the packet nodes based on the packet node link information, and designate, as a second type, the optical node and a link of which a path has not been set, from among the packet nodes.

The cross-layer management unit may store, in a TEDB of a packet transport layer, the link designated as the first type or the second type as packet layer TE link information, and store, in the TEDB of the packet transport layer, metric information defined by a policy, with respect to the link designated as the second type.

The cross-layer management unit may compare the set upper layer path and inter-layer topology information, and, when a path passing the link of the second type among the upper layer paths is present, commands the lower layer path setting unit to re-set the lower layer path.

When receiving the lower layer path re-set by the lower layer path setting unit, the cross-layer management unit may change the link of the second type to the link of the first type.

According to an aspect of the present invention, there is provided an inter-layer path provisioning method in a multilayer network, the inter-layer path provisioning method including: setting an upper layer path associated with a plurality of packet node paths included in a packet layer to be interlocked with an upper layer path computation unit, in response to a path setting request of an operator; setting a lower layer path associated with a plurality of optical node paths included in an optical layer to be interlocked with a lower layer path computation unit, separately from the setting of the upper layer path; and performing a connection between the set upper layer path and the set lower layer path.

Additional aspects, features, and/or advantages of the invention will be set forth in part in the description which follows and, in part, will be apparent from the description, or may be learned by practice of the invention.

EFFECT

According to a present invention, there is provided an inter-layer path provisioning method and system in a multilayer network that sets a lower layer path, separately from setting of an upper layer, thereby guaranteeing independence of a path computation unit existing for each layer, and protecting inter-layer path information.

According to a present invention, there is provided an inter-layer path provisioning method and system in a multilayer network that enables an unconnected virtual link, that is, a link of a second type, in topology information between an upper layer path and a lower layer path to be selectively used on the upper layer path by an operator, thereby reducing complexity in path computation.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
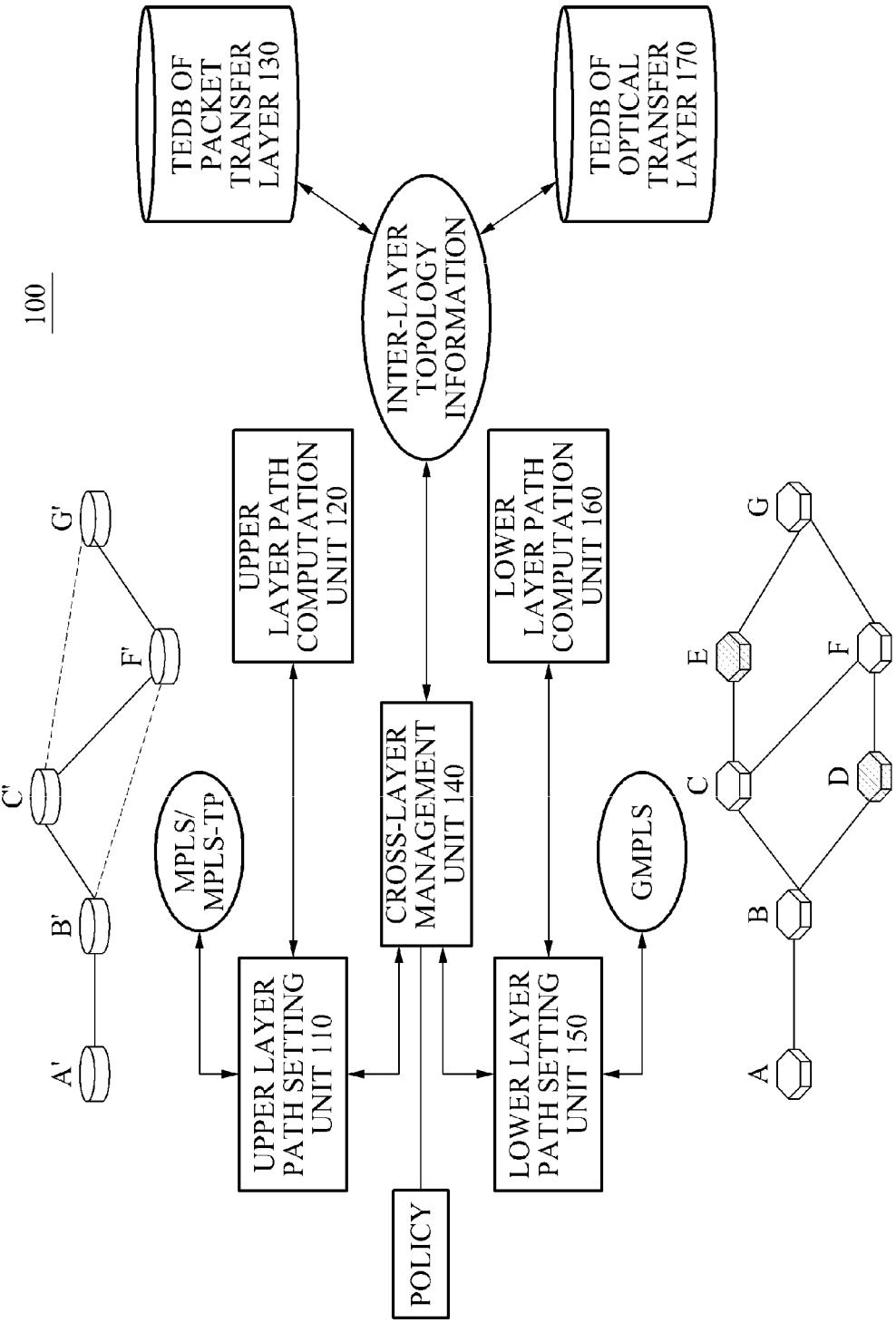
FIG. 1 is a diagram illustrating a configuration of an inter-layer path provisioning system in a multilayer network according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of an inter-layer path provisioning system 100 in a multilayer network according to an embodiment of the present invention.

Referring to FIG. 1, the inter-layer provisioning system 100 includes an upper layer path setting unit 110, an upper layer path computation unit 120, a Traffic Engineering Database (TEDB) 130 of a packet transport layer, a cross-layer management unit 140, a lower layer path setting unit 150, a lower layer path computation unit 160, and a TEDB 170 of an optical transport layer.

The upper layer is configured as a packet network that is operated based on a packet to be applied to a data network, and capable of packet path setting. For example, the upper layer is configured to have a plurality of packet nodes (A', B', C', F', and G').

Also, the lower layer is an optical network layer that is capable of optical path setting in which flexible shape change is achieved, such as Reconfigurable Add/Drop Multiplexer (ROADM). For example, the lower layer is configured to have a plurality of optical nodes (A to G).

The inter-layer provisioning system 100 is characterized in that packet path setting of the upper layer is performed, and optical path setting of the lower layer is performed separately from the setting of the upper layer, and inter-layer path provisioning is achieved through interlocking between the setting of the upper layer and the setting of the lower layer.

The upper layer path setting unit(for example, PPS: Packet-Layer Provisioning System) 110 may set an upper layer path to be interlocked with an upper layer path computation unit 120 when receiving a path setting request from an operator.

The upper layer path computation unit(for example, PCE_PTL: Path Computation Element_Packet Transport Layer) 120 may compute a path for a plurality of packet nodes included in the upper layer. For example, the upper layer path computation unit 120 may extract packet layer TE link information from the TEDB 130 of the packet transport layer, compute a path among respective packet nodes included in the upper layer using the extracted packet layer TE link information, and transport the computed path among the respective packet nodes to the upper layer path setting unit 110.

The TEDB 130 of the packet transport layer may have TE link information of the packet layer in real time, and enable changed information of the lower layer to be reflected on the upper layer using a managed scheme or a protocol.

Accordingly, the upper layer path setting unit 110 may set the upper layer path using the transported path among the respective packet nodes. The upper layer path setting unit 110 may transport the set upper layer path to the cross-layer management unit 140, thereby verifying a connection function between layers for the set upper layer path.

In this instance, the upper layer path setting unit 110 may set the upper layer path using a Permanent Connection (PC) scheme or a Semi-Permanent Connection (SPC) scheme.

In this instance, the PC scheme may be a method of setting a path in a Management Plane (MP) by transporting path setting information to each node in the upper layer path setting unit 110. The SPC scheme may be a method of setting a path using Multiprotocol Label Switching (MPLS) or MPLS-Transport Profile (MPLS_TP), that is, a signaling function, in the upper layer path setting unit 110, in an interlocking between the MP and a Control Plane (CP). In the case of the SPC scheme, the upper layer path setting unit 110 may set the upper layer path by transporting the computed path to the MPLS/MPLS-TP in response to a request of the operator.

When the upper layer path setting unit 110 is a starting point for packet path setting in the packet layer, the lower layer path setting unit 150 may be a starting point for optical path setting in the optical layer. For example, similar to the upper layer path setting unit 110, the lower layer path setting unit 150 may set a lower layer path to be interlocked with the lower layer path computation unit 160 and a matching function of an operator.

The lower layer path computation unit(for example, PCE_OTL: Path computation element optical transport layer) 160 may compute a path using the SPC scheme in the optical transport layer to be interlocked with Generalized MPLS (GMPLS), separately from the setting of the upper layer path. For example, the lower layer path computation unit 160 may extract optical layer TE link information from the TEDB 170 of the optical transport layer, compute a path among respective optical nodes included in the lower layer using the extracted optical layer TE link information, and transport the computed path among the respective optical nodes to the lower layer path setting unit 150.

Accordingly, the lower layer path setting unit 150 may set the lower layer path using the transported path among the respective optical nodes, and transport the set lower layer path to the cross-layer management unit 140.

The cross-layer management unit 140 may configure inter-layer topology information using the TEDB 130 of the packet transport layer and the TEDB 170 of the optical transport layer, and perform a connection between the upper layer path and the lower layer path based on the configured inter-layer topology information.

The cross-layer management unit 140 may perform a bridge role for inter-layer connection through an interlocking between the upper layer path setting unit 110 and the lower layer path setting unit 150, configure the inter-layer topology information based on the TE link information configured for each layer, and connect the upper layer path with the lower layer path based on the configured inter-layer topology information so that the upper layer path and the lower layer path are mutually interlocked.

An inter-layer dynamic path setting method according to an embodiment may include configuring multilayer topology information for path setting of the upper layer in the multilayer network that is configured to have the upper layer and the lower layer, and setting dynamic multilayer path in the configured multilayer topology information.

Figure 2:
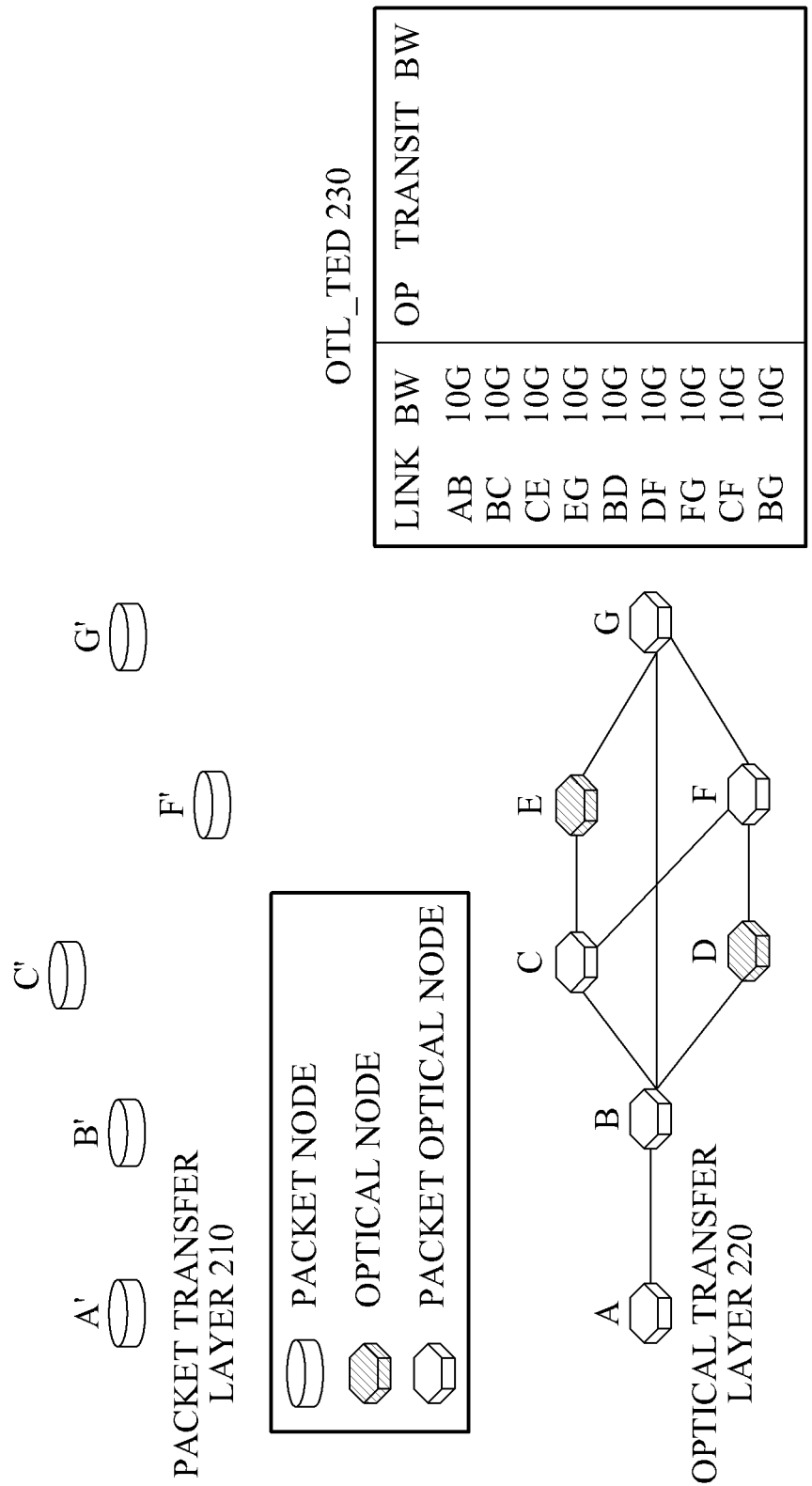
FIG. 2 is a diagram illustrating an example of configuring information of a lower layer for inter-layer topology configuration.

FIG. 2 is a diagram illustrating an example of configuring information of a lower layer for inter-layer topology configuration.

Referring to FIG. 2, the multilayer network may be configured to have various types of nodes. In general, a packet transport layer 210 may be configured to have a packet node, and an optical transport layer 220 may be configured to have an optical node, however, a packet optical node that simultaneously acts as the optical node and the packet node may exist.

The lower layer may include an optical layer, and have a path in the optical layer through a connection between optical network nodes (hereinafter, referred to as 'optical node'). Accordingly, an optical path in the optical transport layer may be achieved based on TE link information in the optical transport layer. An optical transport layer-TEDB (OTL-TED) 230 may have optical path information set together with optical TE link information of the optical layer. Initially, as illustrated in FIG. 2, only the TE link information of the optical layer may be configured.

Figure 3:
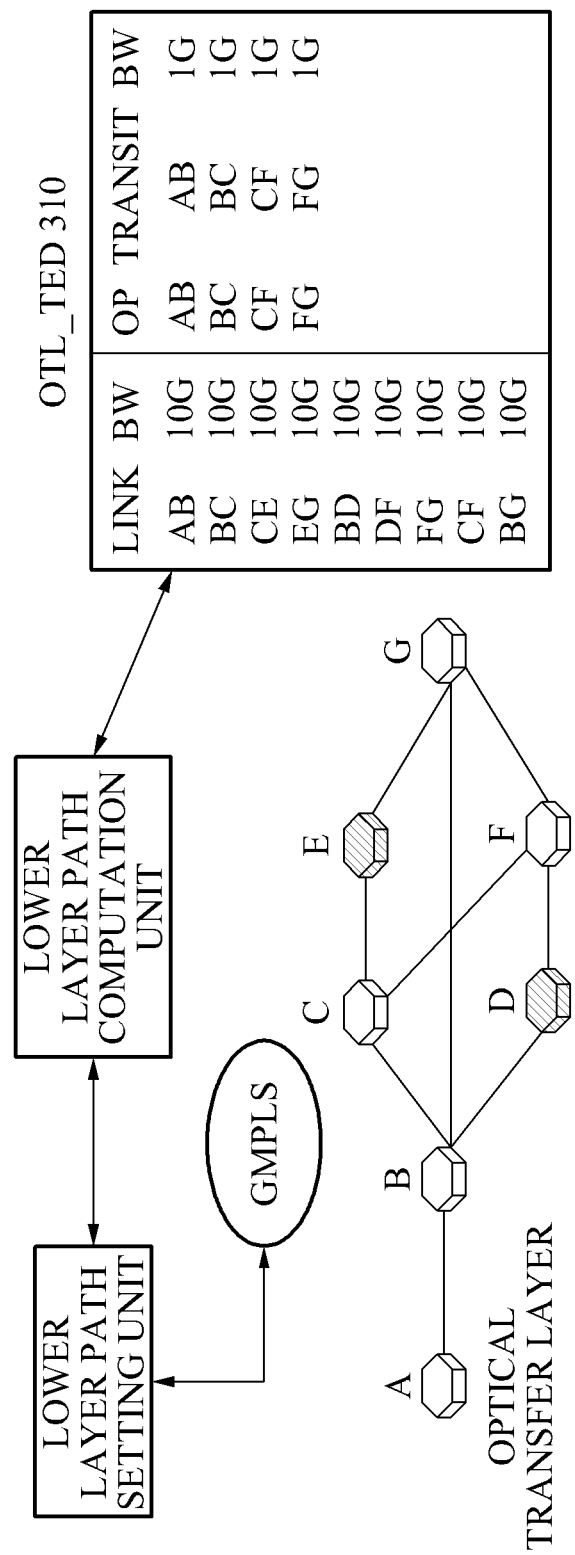
FIG. 3 is a diagram illustrating an example of setting an optical path in a lower layer.

FIG. 3 is a diagram illustrating an example of setting an optical path in a lower layer.

Referring to FIG. 3, the lower layer path setting unit 150 may receive an optical path setting request from an operator, and request that the lower layer path computation unit 160 performs path computation for a plurality of optical nodes included in the lower layer.

The lower layer path computation unit 160 may compute a path based on an optical transport layer-TEDB 310 (hereinafter, referred to as 'OTL-TED'), and transport the computed path to the lower layer path setting unit 150.

The lower layer path setting unit 150 may transport connection information to the optical node according to the transported path, thereby configuring an optical path in an optical layer. The Optical Path (OP) configured in the OTL-TED 310 may indicate a set optical path, and also indicate a via node for transit. Also, the lower layer path setting unit 150 may set a band of the optical path within a bandwidth (BW) of a link. When receiving the path setting request in the SPC scheme, the lower layer path setting unit 150 may transport the computed path to the GMPLS, so that a corresponding path setting may be performed through signaling.

Figure 4:
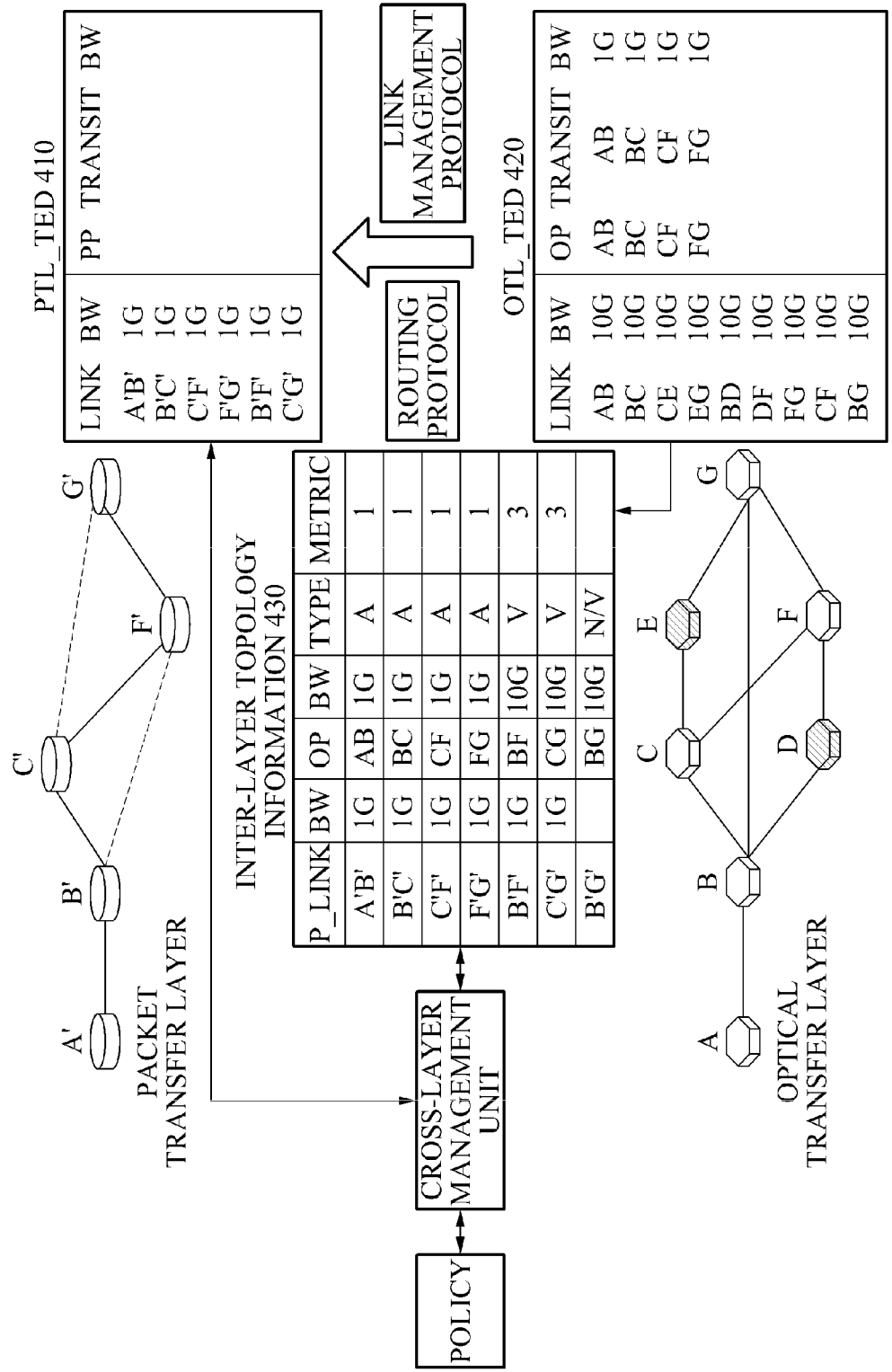
FIG. 4 is a diagram illustrating an example of configuring inter-layer topology by analyzing optical layer Traffic Engineering (TE) link information and an optical path.

FIG. 4 is a diagram illustrating an example of configuring inter-layer topology by analyzing optical layer TE link information and an optical path.

Referring to FIG. 4, to reflect a link and path of a lower layer on a link and path of an upper layer, an automated method of using a routing protocol (for example, Routing listener(RL) or a Link Management Protocol (LMP) may be adopted. However, when using the routing protocol or the LMP, only information configured to have the optical layer path of the lower layer may be reflected on the TE link information of the upper layer. Here, it is difficult to reflect virtual TE link information such as a B'F' link and a C'G' link included in inter-layer topology information 430.

Accordingly, the cross-layer management unit 140 may configure the inter-layer topology information based on an optical transport layer-TEDB 420 (hereinafter, referred to as 'OTL_TED'), and apply the configured inter-layer topology information to a packet transport layer-TEDB 410 (hereinafter, referred to as 'PTL_TED').

First, the cross-layer management unit 140 may analyze a relationship between optical layer TE link information among nodes of the OTL_TED 420 and packet transport layer nodes, and extract connectable packet node link information (P_Link) in the packet transport layer. Next, the cross-layer management unit 140 may designate, as a first type ('A'ctual type), the optical node and a link in which a path has been already set from among the packet nodes, based on the extracted packet node link information.

Also, the cross-layer management unit 140 may designate, as a second type ('V'irtual type), the optical node and a link in which a path has not been set from among the packet nodes. For example, remaining packet node link information may correspond to links in which paths are not yet connected even though being connectable in the optical layer through the optical path. The cross-layer management unit 140 may select a link intended to be utilized as a 'virtual link' according to a policy, from among the links in which the paths are not yet connected even though being connectable in the optical layer through the optical path, and designate the selected link as the second type. According to the policy when designating the virtual link, a band of the virtual link may be defined within an available band of a corresponding optical path, and metric information of the virtual link utilized in path computation may be arbitrarily determined.

Also, the link that is not selected according to the policy from among the links in which the paths are not yet connected even though being connectable may be a link that is not utilized in the lower layer or the upper layer, so that the link not being selected is not utilized as the virtual link. The cross-layer management unit 140 may designate, as 'N/A', a type of the link that is not utilized in the lower layer or the upper layer.

Also, the cross-layer management unit 140 may register, as packet TE link information, the links designated as the first type or the second type from among the configured inter-layer topology information, in the PTL_TED 410. In this instance, the link registered in the PTL_TED 410 may be recognized as the same link without being divided into the first type and the second type. However, the metric information defined by the policy may be used to be reflected on the TED, which is to maximally prevent the link (virtual link) of the second type in the path computation from being selected. The metric information defined by the policy may be used to be reflected on the TED (Maximally preventing the link (virtual link) of the second type in the path computation from being selected may be performed) because when the virtual link is selected from the path even though a connected link exists, the lower layer is required to be re-set, and the upper layer is required to be connected.

Accordingly, the cross-layer management unit 140 may set an inter-layer path using the inter-layer topology information and the DBs 130 and 170 configured for each layer.

Figure 5:
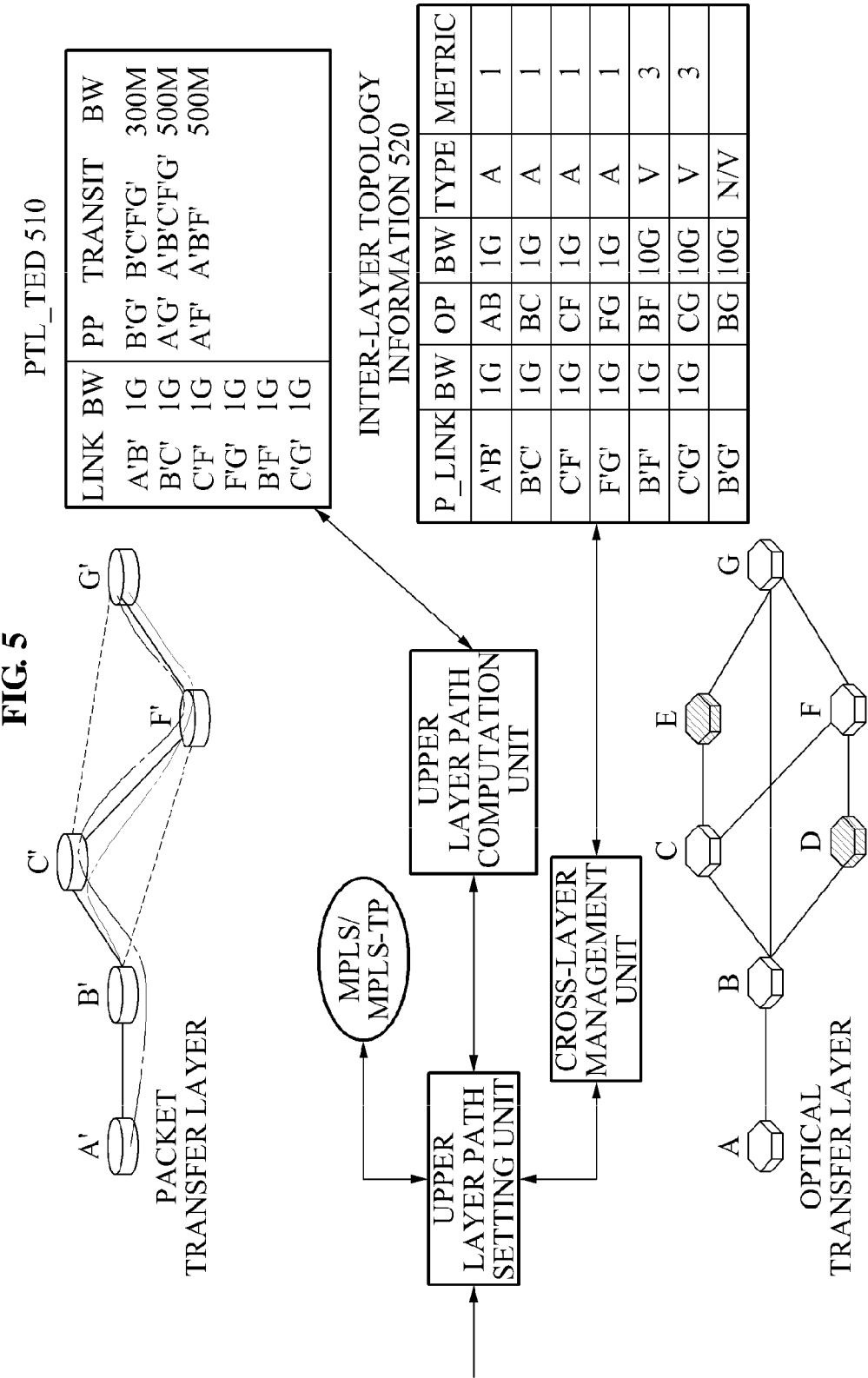
FIG. 5 is a diagram illustrating an example of setting an upper layer path in a packet layer.

FIG. 5 is a diagram illustrating an example of setting an upper layer path in a packet layer.

Referring to FIG. 5, the cross-layer management unit 140 may compare inter-layer topology information from among the paths received from the upper layer path setting unit 110, using a PTL_TED 510 and inter-layer topology information 520, and thereby may verify whether to pass the link of the second type from among the paths obtained in the path computation.

Since B'G' or A'G' does not pass a virtual link among transit paths based on a packet path (PP) of an upper layer path, the cross-layer management unit 140 may verify the upper layer path from the upper layer path setting unit 110 without performing a separate operation. Accordingly, the upper layer path setting unit 110 may set the computed path as the upper layer path using the SPC scheme or the PC scheme.

However, A'F' finally computed in the packet path (PP) may pass B'F' of the transit links, which corresponds to a link of the second type managed in the inter-layer topology information 520. Here, the cross-layer management unit 140 may command the lower layer path setting unit 150 to re-set the lower layer path.

Figure 6:
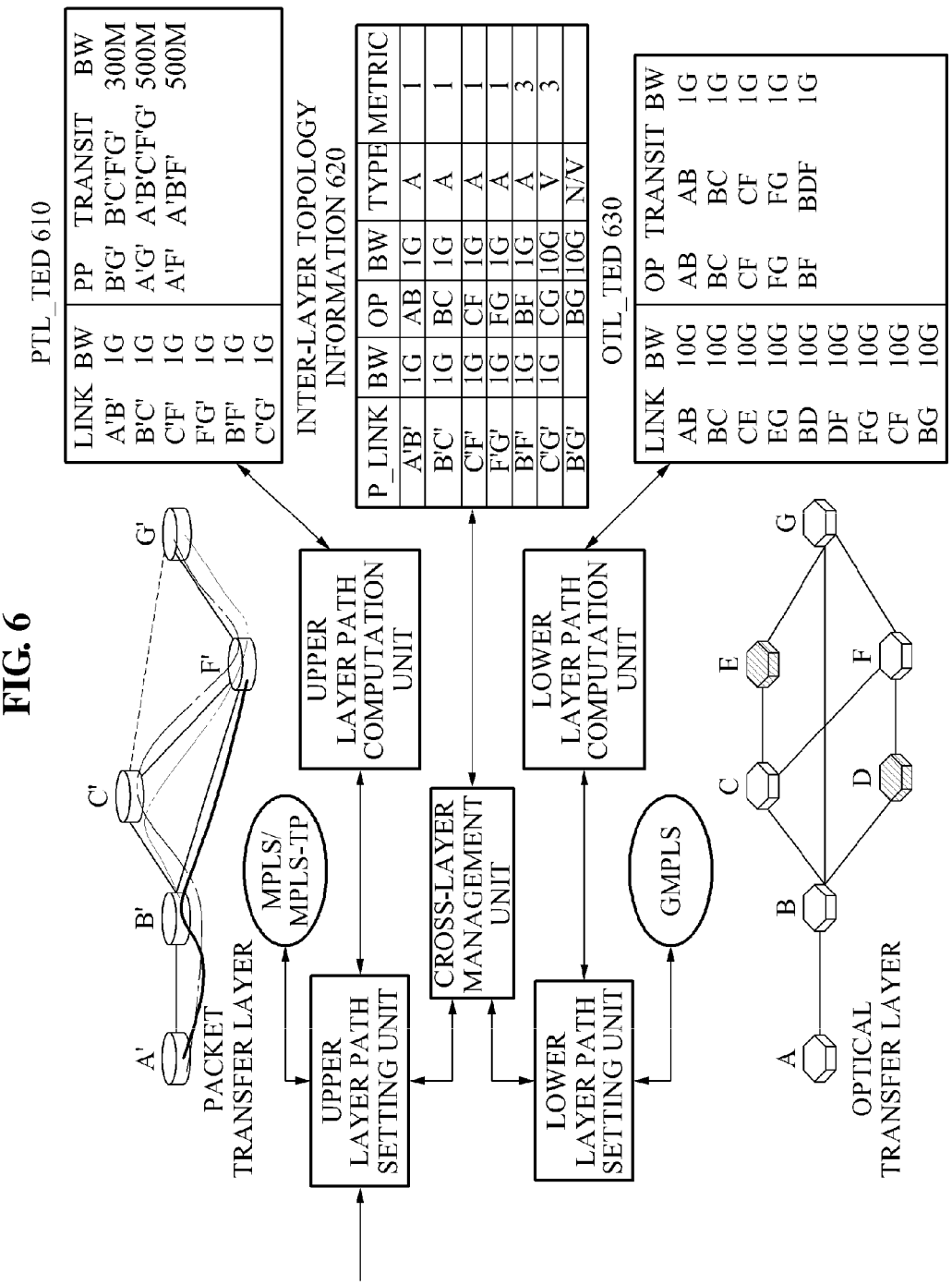
FIG. 6 is a diagram illustrating an example of re-setting a lower layer path when a link of a second type is included in an upper layer path.

FIG. 6 is a diagram illustrating an example of re-setting a lower layer path when a link of a second type is included in an upper layer path.

Referring to FIG. 6, when a link of a second type is selected in inter-layer topology information 620, the cross-layer management unit 140 may request that the lower layer path setting unit 150 performs the lower layer path setting. In this instance, the requested path may be a band that is set as a path corresponding to an optical path (OP) corresponding to the link of the second type in the inter-layer topology information 620, and set as the link of the second type.

The lower layer path setting unit 150 may compute the requested path through the lower layer path computation unit 160, and re-set the lower layer path in the PC scheme or the SPC scheme using the computed path. The lower layer path setting unit 150 may register the re-set lower layer path in an OTL_TED 630, and transport the re-set lower layer path to the cross-layer management unit 140.

The cross-layer management unit 140 may change the link of the second type to the link of the first type when receiving the re-set lower layer path. In this instance, there is no change in the upper layer path setting unit 110 or a PTL_TED 610 the upper layer path setting unit 110 and a PTL_TED 610 remain the same.

The cross-layer management unit 140 may inform the upper layer path setting unit 110 that the lower layer path is verified, and set the upper layer path in the PC scheme or the SPC scheme.

Figure 7:
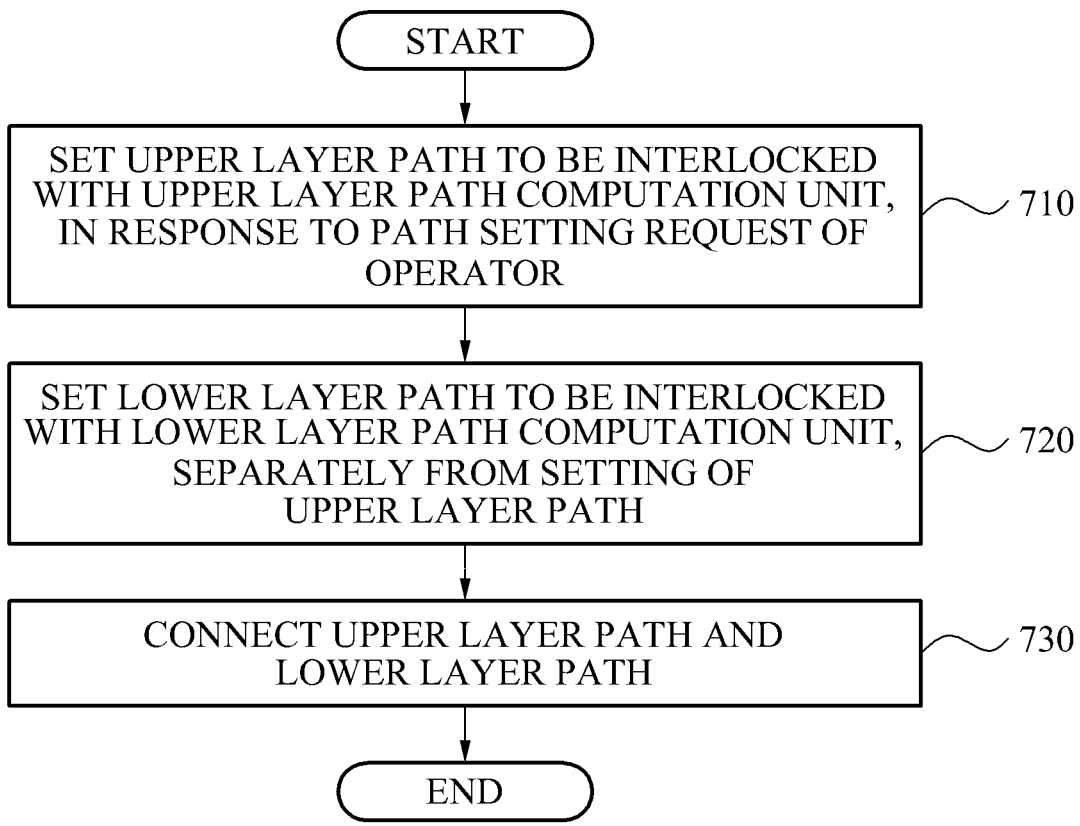
FIG. 7 is a flowchart illustrating an inter-layer path provisioning method in a multilayer network according to an embodiment of the present invention.

FIG. 7 is a flowchart illustrating an inter-layer path provisioning method in a multilayer network according to an embodiment of the present invention.

Referring to FIG. 7, in operation 710, the inter-layer path provisioning system 100 in the multilayer network may set an upper layer path associated with a plurality of packet node paths included in a packet layer to be interlocked with the upper layer path computation unit 120, in response to a path setting request of an operator. According to an embodiment, the inter-layer path provisioning system 100 may extract packet layer TE link information from the TEDB 130 of the packet transport layer through the upper layer path computation unit 120, compute a path among respective packet nodes included in the upper layer using the extracted packet layer TE link information, and set the upper layer path using the computed path among the respective packet nodes.

In operation 720, the inter-layer path provisioning system 100 may set a lower layer path associated with a plurality of optical node paths included in an optical layer to be interlocked with the lower layer path computation unit 160, separately from the setting of the upper layer path. According to an embodiment, the inter-layer path provisioning system 100 may extract the optical layer TE link information from the TEDB 170 of the optical transport layer, compute the path among the respective optical nodes included in the lower layer using the extracted optical layer TE link information, and set the lower layer path using the computed path among the respective optical nodes.

In operation 730, the inter-layer path provisioning system 100 may perform a connection between the set upper layer path and the set lower layer path. For the connection, the inter-layer path provisioning system 100 may configure inter-layer topology information using the TEDB 170 of the optical transport layer and the TEDB 130 of the packet transport layer, and perform the connection between the upper layer path and the lower layer path based on the configured inter-layer topology information.

The inter-layer path provisioning system 100 may extract, as a first type, connectable packet node link information from the upper layer by analyzing a relationship between a packet node included in the upper layer and an optical node included in the lower layer, designate from among the packet nodes based on the packet node link information, the optical node and a link of which a path has been already set, and designate, as a second type, the optical node and a link of which a path has not been set, from among the packet nodes.

The inter-layer path provisioning system 100 may store, in the TEDB 130 of the packet transport layer, the link designated as the first type or the second type as the inter-layer topology information, and store, in the TEDB 130 of the packet transport layer, metric information defined by a policy with respect to the link designated as the second type.

Next, the inter-layer path provisioning system 100 may compare the set upper layer path and inter-layer topology information, and command the lower layer path setting unit to re-set the lower layer path when a path passing the link of the second type among the upper layer paths is present based on the result of the comparing and thus, the link of the second type may be changed to the link of the first type when the lower layer path re-set by the lower layer path setting unit 150 is received.

The method according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An inter-layer path provisioning system in a multilayer network, the inter-layer path provisioning system comprising:

an upper layer path setting unit to set an upper layer path to be interlocked with an upper layer path computation unit, in response to a path setting request of an operator;

a lower layer path setting unit to set a lower layer path to be interlocked with a lower layer path computation unit, separately from the setting of the upper layer path; and a cross-layer management unit to perform a connection between the set upper layer path and the set lower layer path, wherein the upper layer path is associated with a plurality of packet node paths included in a packet layer, and the lower layer path is associated with a plurality of optical node paths included in an optical layer, wherein the cross-layer management unit analyzes a relationship of packet nodes included in the packet layer with optical nodes included in the optical layer, extracts connectable packet node link information from the packet layer, designates, as a first type, one of the optical nodes and a link of which a path has been already set, from among the packet nodes based on the packet node link information, and designates, as a second type, the one of the optical nodes and a link of which a path has not been set, from among the packet nodes.

2. The inter-layer path provisioning system of claim 1, wherein: the upper layer path computation unit extracts packet layer Traffic Engineering (TE) link information from a TE Database (TEDB) of a packet transport layer, computes a path among respective packet nodes included in the upper layer using the extracted packet layer TE link information, and transports the computed path among the respective packet nodes to the upper layer path setting unit, and the upper layer path setting unit sets the upper layer path using the transported path among the respective packet nodes.

3. The inter-layer path provisioning system of claim 1, wherein the cross-layer management unit configures inter-layer topology information using a TEDB of a packet transport layer and a TEDB of an optical transport layer, and performs the connection between the upper layer path and the lower layer path based on the configured topology information.

4. The inter-layer path provisioning system of claim 1, wherein: the lower layer path computation unit extracts optical layer TE link information from a TEDB of an optical transport layer, computes a path among respective nodes included in the lower layer using the extracted optical layer TE link information, and transports the computed path among the respective nodes to the lower layer path setting unit, and the lower layer path setting unit sets the lower layer path using the transported path among the respective packet nodes.

5. An inter-layer path provisioning system in a multilayer network, the inter-layer path provisioning system comprising:

an upper layer path setting unit to set an upper layer path to be interlocked with an upper layer path computation unit, in response to a path setting request of an operator;

a lower layer path setting unit to set a lower layer path to be interlocked with a lower layer path computation unit, separately from the setting of the upper layer path; and a cross-layer management unit to perform a connection between the set upper layer path and the set lower layer path, wherein the cross-layer management unit analyzes a relationship of a packet node included in the upper layer with an optical node included in the lower layer, extracts connectable packet node link information from the upper layer, designates, as a first type, the optical node and a link of which a path has been already set, from among the packet nodes based on the packet node link information, and designates, as a second type, the optical node and a link of which a path has not been set, from among the packet nodes.

6. The inter-layer path provisioning system of claim 5, wherein the cross-layer management unit stores, in a TEDB of a packet transport layer, the link designated as the first type or the second type as packet layer TE link information, and stores, in the TEDB of the packet transport layer, metric information defined by a policy, with respect to the link designated as the second type.

7. The inter-layer path provisioning system of claim 5, wherein the cross-layer management unit compares the set upper layer path and inter-layer topology information, and, when a path passing the link of the second type among the upper layer paths is present, commands the lower layer path setting unit to re-set the lower layer path.

8. The inter-layer path provisioning system of claim 7, wherein, when receiving the lower layer path re-set by the lower layer path setting unit, the cross-layer management unit changes the link of the second type to the link of the first type.

9. An inter-layer path provisioning method in a multilayer network, the inter-layer path provisioning method comprising:
    setting an upper layer path associated with a plurality of packet node paths included in a packet layer to be interlocked with an upper layer path computation unit, in response to a path setting request of an operator;
    setting a lower layer path associated with a plurality of optical node paths included in an optical layer to be interlocked with a lower layer path computation unit, separately from the setting of the upper layer path; and
    performing a connection between the set upper layer path and the set lower layer path;
    wherein the cross-layer management unit analyzes a relationship of packet nodes included in the packet layer with optical nodes included in the optical layer, extracts connectable packet node link information from the packet layer, designates, as a first type, one of the optical nodes and a link of which a path has been already set, from among the packet nodes based on the packet node link information, and designates, as a second type, the one of the optical nodes and a link of which a path has not been set, from among the packet nodes.

10. The inter-layer path provisioning method of claim 9, wherein the setting of the upper layer path comprises: extracting packet layer TE link information from a TEDB of a packet transport layer; computing a path among respective packet nodes included in the upper layer using the extracted packet layer TE link information; and setting the upper layer path using the computed path among the respective packet nodes.

11. The inter-layer path provisioning method of claim 9, wherein the performing of the connection comprises: configuring inter-layer topology information using a TEDB of a packet transport layer and a TEDB of an optical transport layer; and performing the connection between the set upper layer path and the set lower layer path based on the configured inter-layer topology information.

12. The inter-layer path provisioning method of claim 9, wherein the setting of the lower layer path comprises: extracting optical layer TE link information from a TEDB of an optical transport layer; computing a path among respective optical nodes included in the lower layer, using the extracted optical layer TE link information, and setting the lower layer path using the computed path among the respective optical nodes.

13. An inter-layer path provisioning method in a multilayer network, the inter-layer path provisioning method comprising:
    setting an upper layer path associated with a plurality of packet node paths included in a packet layer to be interlocked with an upper layer path computation unit, in response to a path setting request of an operator;
    setting a lower layer path associated with a plurality of optical node paths included in an optical layer to be interlocked with a lower layer path computation unit, separately from the setting of the upper layer path; and
    performing a connection between the set upper layer path and the set lower layer path;
    extracting connectable packet node link information from the upper layer by analyzing a relationship of a packet node included in the upper layer with an optical node included in the lower layer; designating, as a first type, the optical node and a link of which a path has been already set from among the packet nodes, based on the packet node link information; and
    designating, as a second type, the optical node and a link of which a path has not been set from among the packet nodes, based on the packet node link information.

14. The inter-layer path provisioning method of claim 13, further comprising:
    storing, in a TEDB of a packet transport layer, the link designated as the first type or the second type as packet layer TE link information; and storing, in the TEDB of the packet transport layer, metric information defined by a policy, with respect to the link designated as the second type.

15. The inter-layer path provisioning method of claim 13, further comprising:
    comparing the set upper layer path and inter-layer topology information; commanding the lower layer path setting unit to re-set the lower layer path when a path passing the link of the second type among the upper layer paths is present based on the compared result; and changing the link of the second type to the link of the first type when receiving the re-set lower layer path.

* * * * *